US012563300B2

(12) United States Patent
Jönsson et al.

(10) Patent No.: US 12,563,300 B2
(45) Date of Patent: Feb. 24, 2026

(54) METHOD AND SYSTEM FOR CONTROLLING A GUARD TOUR OF A THERMAL CAMERA

(71) Applicant: Axis AB, Lund (SE)

(72) Inventors: Jörgen Jönsson, Lund (SE); Thomas Winzell, Lund (SE)

(73) Assignee: AXIS AB, Lund (SE)

( * ) Notice: Subject to any disclaimer, the term of this patent is extended or adjusted under 35 U.S.C. 154(b) by 47 days.

(21) Appl. No.: 18/306,284

(22) Filed: Apr. 25, 2023

(65) Prior Publication Data

US 2023/0403472 A1 Dec. 14, 2023

(30) Foreign Application Priority Data

Jun. 13, 2022 (EP) ..................................... 22178680

(51) Int. Cl.
| | |
|---|---|
| *H04N 23/695* | (2023.01) |
| *G01J 5/00* | (2022.01) |
| *G01J 5/48* | (2022.01) |
| *H04N 7/18* | (2006.01) |
| *H04N 23/23* | (2023.01) |

(52) U.S. Cl.
CPC ............ *H04N 23/695* (2023.01); *G01J 5/485* (2022.01); *H04N 7/183* (2013.01); *H04N 23/23* (2023.01); *G01J 2005/0077* (2013.01)

(58) Field of Classification Search
None
See application file for complete search history.

(56) References Cited

U.S. PATENT DOCUMENTS

| | | | | |
|---|---|---|---|---|
| 7,289,023 B2 * | 10/2007 | Schneider | .............. | G08B 29/24 |
| | | | | 340/506 |
| 10,070,077 B2 * | 9/2018 | Westmacott | ........... | H04N 23/69 |
| 11,941,569 B2 * | 3/2024 | Kinney | ............ | G06Q 10/06398 |
| 2004/0129434 A1 * | 7/2004 | Tan | ........................ | A62C 37/40 |
| | | | | 239/69 |
| 2005/0069207 A1 * | 3/2005 | Zakrzewski | ........... | G06V 20/52 |
| | | | | 382/218 |

(Continued)

FOREIGN PATENT DOCUMENTS

| | | | | | |
|---|---|---|---|---|---|
| CN | 106485868 A | * | 3/2017 | ........... | G06V 20/188 |
| CN | 106485868 B | | 7/2019 | | |

(Continued)

*Primary Examiner* — Gelek W Topgyal
(74) *Attorney, Agent, or Firm* — Volpe Koenig

(57) ABSTRACT

A method of controlling a guard tour of a thermal camera, wherein the thermal camera is a pan-tilt camera or a pan-tilt-zoom camera, comprises the steps of: obtaining a guard tour comprising a plurality of views of an area or facility and a sequence of movements and/or view times of the thermal camera for traversing the plurality of views; controlling the thermal camera to traverse the plurality of views according to the sequence of movements and view times of the guard tour; for each view: extracting a temperature profile based on thermal images from the thermal camera; based on the temperature profile, estimating whether an increased risk of overheating or overcooling exists for the view; and if so, adjusting the sequence of movements and view times of the thermal camera to show the view having an increased risk of overheating or overcooling more frequently.

13 Claims, 6 Drawing Sheets

(56) References Cited

U.S. PATENT DOCUMENTS

| | | | | |
|---|---|---|---|---|
| 2005/0244033 A1* | 11/2005 | Ekin | | H04N 7/181 |
| | | | | 382/103 |
| 2006/0104625 A1* | 5/2006 | Oya | | H04N 23/695 |
| | | | | 396/428 |
| 2012/0169882 A1* | 7/2012 | Millar | | G08B 13/19608 |
| | | | | 348/E7.086 |
| 2012/0206426 A1* | 8/2012 | Sakakima | | G09G 3/3426 |
| | | | | 345/207 |
| 2013/0242091 A1* | 9/2013 | Park | | G08B 13/196 |
| | | | | 348/143 |
| 2014/0027131 A1 | 1/2014 | Kawiecki | | |
| 2014/0049640 A1* | 2/2014 | Shishalov | | H04N 7/18 |
| | | | | 348/143 |
| 2014/0078300 A1* | 3/2014 | Tine | | G08B 13/196 |
| | | | | 348/E5.042 |
| 2016/0116914 A1 | 4/2016 | Mucci | | |
| 2016/0321900 A1* | 11/2016 | Rao | | B05B 12/12 |
| 2017/0259097 A1* | 9/2017 | Orglmeister | | A62C 31/28 |
| 2018/0102034 A1 | 4/2018 | Liu et al. | | |
| 2018/0247510 A1* | 8/2018 | Rao | | A62C 37/36 |
| 2019/0132512 A1* | 5/2019 | Jones | | H04N 23/23 |
| 2019/0318598 A1* | 10/2019 | Aponte Luis | | H04W 4/90 |
| 2019/0362126 A1* | 11/2019 | Lapczynski | | G06N 3/08 |
| 2020/0225313 A1* | 7/2020 | Coles | | G06Q 90/205 |
| 2020/0226892 A1* | 7/2020 | Coles | | G08B 5/38 |
| 2020/0391061 A1 | 12/2020 | Enejehlm et al. | | |
| 2021/0069538 A1* | 3/2021 | Magnone | | A62C 31/24 |
| 2021/0182765 A1* | 6/2021 | Kinney | | G06Q 10/06398 |
| 2023/0160748 A1* | 5/2023 | Kim | | G01J 5/0018 |
| | | | | 250/554 |
| 2024/0060822 A1* | 2/2024 | Shi | | H04N 23/695 |

FOREIGN PATENT DOCUMENTS

| | | | | | |
|---|---|---|---|---|---|
| CN | 111613009 A | * | 9/2020 | | G06K 9/00362 |
| JP | 4498104 B2 | * | 7/2010 | | G06T 7/254 |
| KR | 101637989 B1 | * | 7/2016 | | G08B 17/00 |
| WO | 2017/137393 A1 | | 8/2017 | | |

* cited by examiner

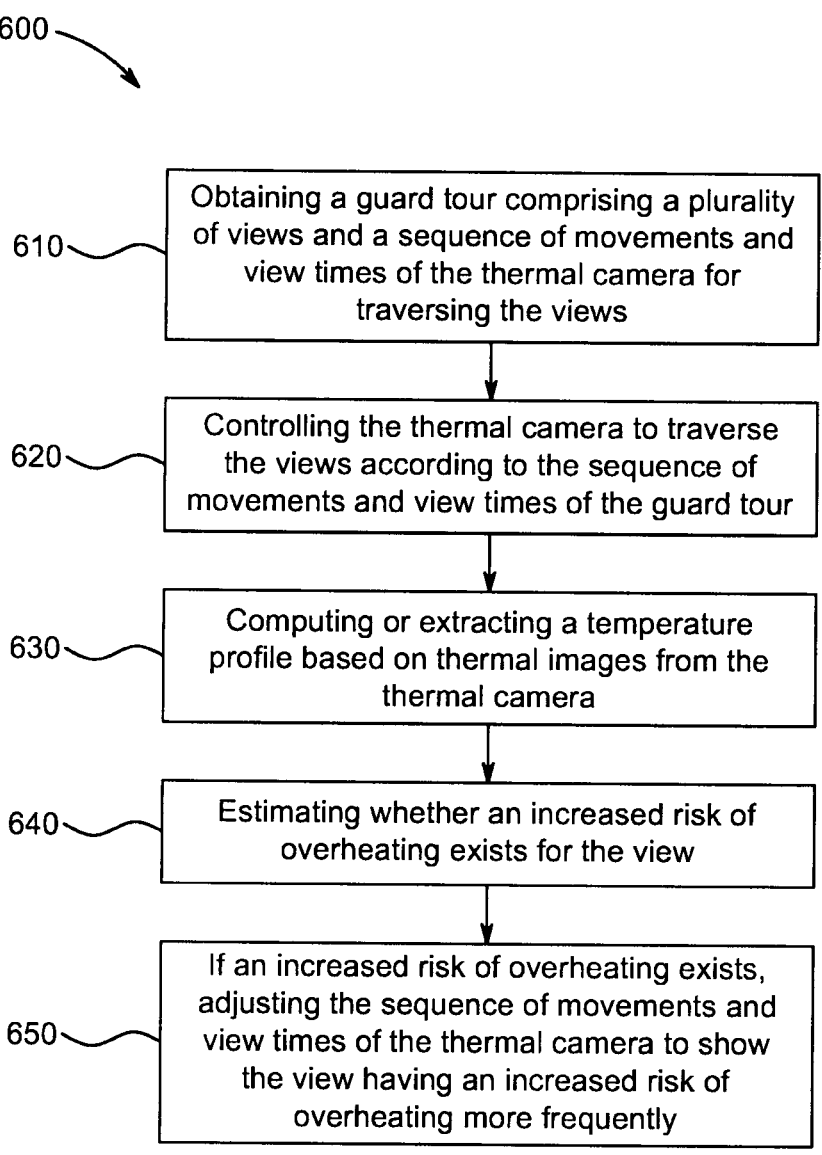

600

610　Obtaining a guard tour comprising a plurality of views and a sequence of movements and view times of the thermal camera for traversing the views 620　Controlling the thermal camera to traverse the views according to the sequence of movements and view times of the guard tour 630　Computing or extracting a temperature profile based on thermal images from the thermal camera 640　Estimating whether an increased risk of overheating exists for the view 650　If an increased risk of overheating exists, adjusting the sequence of movements and view times of the thermal camera to show the view having an increased risk of overheating more frequently

FIG. 5

METHOD AND SYSTEM FOR CONTROLLING A GUARD TOUR OF A THERMAL CAMERA

FIELD OF INVENTION

The present disclosure relates to an improved method of controlling a guard tour of a thermal pan-tilt camera or a pan-tilt-zoom camera. The method can be used for surveillance of, for example, an electrical substation, a manufacturing area, process industry premises or a waste management area or facility. The disclosure further relates to a surveillance system comprising a thermal pan-tilt camera or a pan-tilt-zoom camera, wherein the surveillance system is configured to control a guard tour of the thermal pan-tilt camera or a pan-tilt-zoom camera.

TECHNICAL BACKGROUND

Fires in various systems and areas cause large costs of repair, replacement and unavailability every year. As an example, fires in electrical substations, which are parts of electrical generation, transmission and distribution systems, in which a number of transformation operations are performed, typically have major consequences. A substation may include transformers to change voltage levels between high transmission voltages and lower distribution voltages, or at the interconnection of two different transmission voltages. These and other operations are associated with risks of fire breaking out at the substation.

Other examples of facilities in which risks of fire and self-ignition exist are waste management sites and garbage dumps. High-risk waste includes, for example, residual waste, batteries, electrical and electronics waste.

Conventional methods of tackling the problem are based on reacting quickly to a fire once it breaks out. However, more recently, systems have been proposed, in which thermal cameras and software are used to monitor and alarm if, for example, a temperature is higher than normal. While these systems are useful, there are still challenges related to the need to cover, and make risk assessments for potentially large areas.

SUMMARY

The present disclosure relates to a method and system that address some of these challenges. A Pan Tilt Zoom (PTZ) camera is a camera that is capable of directional and zoom control, either by optical zoom and motors to physically adjust the camera's aim and zoom or by electronic navigation and scaling within a viewing area. In an area or system monitored by a thermal PTZ camera, the thermal PTZ camera may be configured to scan a number of views of an area or facility. A sequence of movements of the thermal PTZ camera that cover several views of the area or facility may be referred to as a 'guard tour'. The thermal PTZ camera may, typically, be a fixed thermal PTZ camera. As mentioned, it may take some time to study a temperature development in a specific view to assess whether a risk of fire exists in the view. As a consequence, while the PTZ camera stays in one view, the risk of fire may increase in other views.

According to a first embodiment, a method of controlling a guard tour of a thermal camera is disclosed, wherein the thermal camera is a pan-tilt camera or a pan-tilt-zoom camera, the method comprising the steps of:

obtaining a guard tour comprising a plurality of views of an area or facility and a sequence of movements and view times of the thermal camera for traversing the plurality of views;

controlling the thermal camera to traverse the plurality of views according to the sequence of movements and view times of the guard tour;

for each view:

computing or extracting a temperature profile based on thermal images from the thermal camera;

based on the temperature profile, estimating whether an increased risk of overheating or overcooling exists for the view; and if an increased risk of overheating or overcooling exists, adjusting the sequence of movements and/or view times of the thermal camera to show the view having an increased risk of overheating or overcooling more frequently.

The area or facility may be, but is not limited to, an electrical substation, a manufacturing area, process industry premises or a waste management area or facility.

By adjusting the sequence of movements and/or view times of the guard tour such that the view having an increased risk of overheating or overcooling is shown more frequently, the guard tour is optimized in a way that increases the chances of generating early warnings and decreases the risks of late warnings, where, for example, a fire has already broken out when the thermal PTZ camera arrives at the view in question.

The computation or extraction of a temperature profile, the estimation whether an increased risk of overheating or overcooling exists for a view, as well as the adjustment of the guard tour, can be carried out in several ways, which are described in further detail in the present disclosure. As an example, the temperature profile may include a current temperature for the view or a current temperature gradient. An increased risk of overheating may exist if the current temperature exceeds a predefined temperature limit and/or if the current temperature gradient exceeds a predefined temperature gradient limit. The temperature profile may, alternatively, or in combination, comprise a spatial temperature distribution. The increased risk of overheating or overcooling can then be assessed based on the spatial temperature distribution in the view. The adjustment of the guard tour to show the view having an increased risk of overheating or overcooling more frequently can also be carried out in a number of ways. For example, the sequence can be changed such that an identified view having an increased risk of overheating or overcooling can occur more than once in a tour covering all views. Alternatively, or in combination, the view times of some or all of the other views can be reduced, at least temporarily.

The disclosure further relates to a surveillance system comprising:

a thermal pan-tilt camera or a pan-tilt-zoom camera configurable to capture thermal images of an area or facility;

a processing unit configured to:

obtain a guard tour comprising a plurality of views of the area or facility and a sequence of movements and view times of the thermal camera for traversing the plurality of views;

controlling, or providing controlling data to an operator or control unit to control the thermal camera to traverse the plurality of views according to the sequence of movements and view times of the guard tour;

for each view:

computing or extracting a temperature profile based on thermal images from the thermal camera;

based on the temperature profile, estimating whether an increased risk of overheating or overcooling exists for the view; and if an increased risk of overheating or overcooling exists, adjusting the sequence of movements and/or view times of the thermal camera to show the view having an increased risk of overheating or overcooling more frequently.

The disclosure further relates to a computer program having instructions which, when executed by a computing device or computing system, cause the computing device or computing system to carry out any embodiment of the presently disclosed method of controlling a guard tour of a thermal camera. Computer program in this context shall be construed broadly and include, for example, a computer program to be run on a PC or a computer adapted to run as part of a surveillance system.

These and other aspects of the disclosure are set forth in the following detailed description.

BRIEF DESCRIPTION OF THE DRAWINGS

The disclosure will in the following be described with reference to the accompanying drawings. The drawings are examples of embodiments and not limiting to the presently disclosed method and system for controlling a guard tour of a thermal camera.

FIG. 5 shows a flow chart of one embodiment of the presently disclosed method of controlling a guard tour of a thermal camera.

DETAILED DESCRIPTION

The present disclosure relates to a method of controlling a guard tour of a thermal camera. Preferably, the thermal camera is a pan-tilt camera or a pan-tilt-zoom camera. The method comprises the steps of:

obtaining a guard tour comprising a plurality of views of an area or facility and a sequence of movements and view times of the thermal camera for traversing the plurality of views; and controlling the thermal camera to traverse the plurality of views according to the sequence of movements and view times of the guard tour.

Preferably, for each view, a temperature profile is computed or extracted based on thermal images from the thermal camera. Based on the temperature profile, it can then be estimated whether an increased risk of overheating or overcooling exists for the view. An increased risk of overheating or overcooling may thereby trigger the method to adjust the sequence of movements and/or view times of the thermal camera to show the view having an increased risk of overheating or overcooling more frequently. The steps may be repeated iteratively. The method may be a computer-implemented method.

Figure 1:
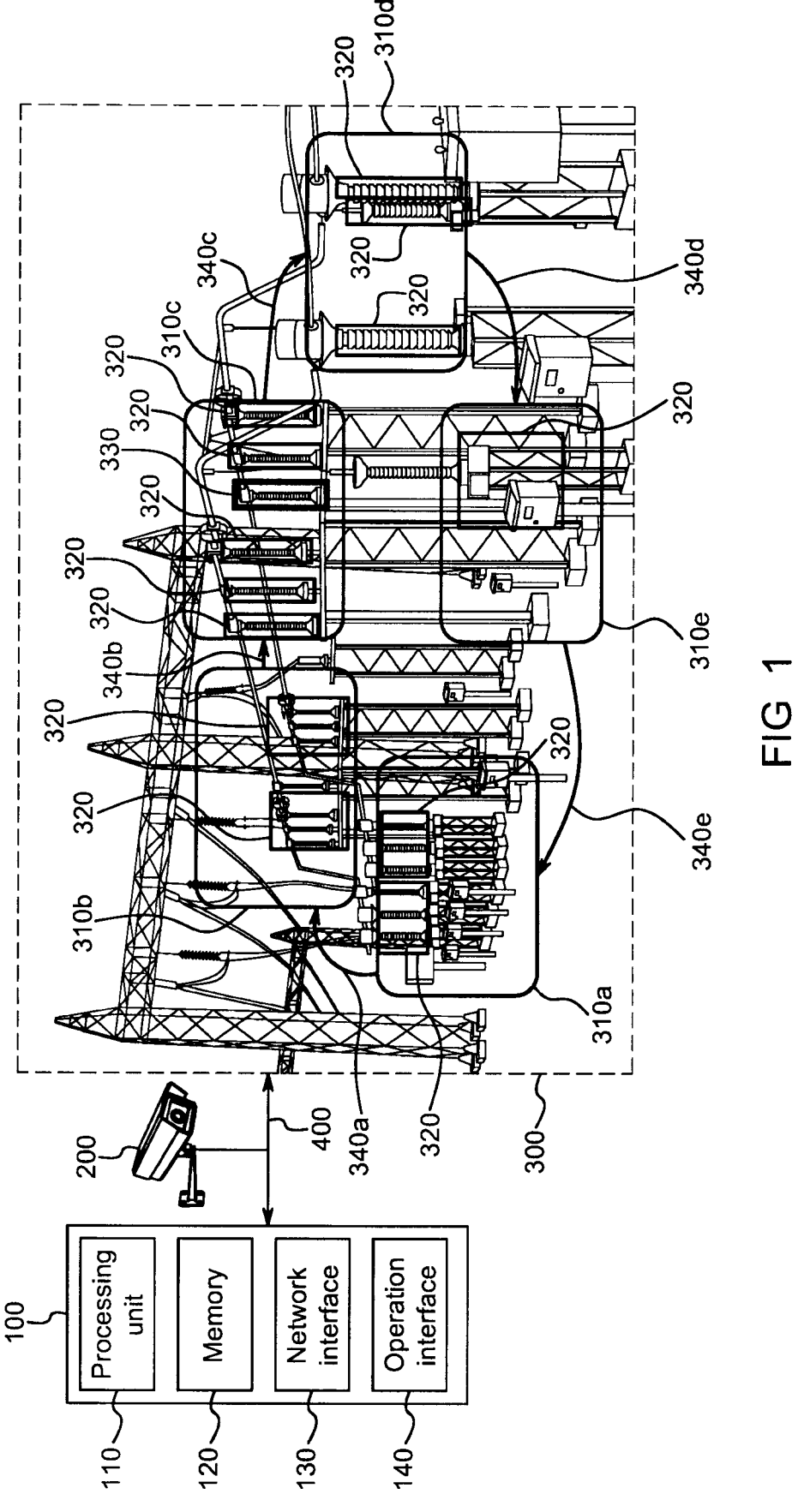
FIG. 1 shows an embodiment of the presently disclosed surveillance system for controlling a guard tour of a thermal pan-tilt camera or a pan-tilt-zoom camera, in which an electrical substation is monitored using a guard tour.

FIG. 1 shows an embodiment of the presently disclosed surveillance system (100) for controlling a guard tour of a thermal pan-tilt camera (200) or a pan-tilt-zoom camera (200), in which an electrical substation (300) is monitored using a guard tour. The surveillance system (100) comprises a processing unit (110), which may be configured to perform any of the tasks related to the presently disclosed method of controlling a guard tour of a thermal camera, including any control or computational task. The surveillance system (100) typically comprises an internal memory (120), which may be used for storing instructions that can be executed by the processing unit (110) and/or data collected by the thermal PTZ camera (200). The surveillance system (100) may further comprise additional peripherals, such as a network interface (130) for communication with the PTZ camera (200) and an operation interface (140) for programming of the surveillance system (100) or obtaining results that can be displayed to a user. The PTZ camera (200) is, preferably, connected to the surveillance system (100) through a communication network (400), which may be, for example, an internet protocol network (400) and/or a wireless network (400). The area or facility, which in the example in FIG. 1 is an electrical substation (300), is divided into a number of views (310a, 310b, 310c, 310d, 310e). The views (310) may comprise sub-views (320, 330), which may be particular areas or objects of interest, which could, for example, be objects that are related to temperature changes, such as transformers in an electrical substation. In view 310c one of the sub-views (330) is identified as a sub-view having an increased risk of overheating. Consequently, the view 310c may be considered a view for which an increased risk of overheating exists. The guard tour in the example of FIG. 1 is the sequence of movements of the thermal PTZ camera (200) to cover the views (310a, 310b, 310c, 310d, 310e). As can be seen there are a number of transitions (340a, 340b, 340c, 340d, 340e) for traversing the views (310a, 310b, 310c, 310d, 310e) in a sequence. Typically, the thermal PTZ camera (200) stays for a given period of time in each view. The view times for the plurality of views can, but do not necessarily have to, be the same for all views initially. There may be reasons for having individual view times for the plurality of views even.

The view times typically depend on the characteristics of the area or facility being surveilled. The view times of the plurality of views may, for example, initially, be at least 10 seconds, or at least 20 seconds. The view times may also, in one embodiment, be defined to be within a range of 10-180 seconds.

FIG. 5 shows a flow chart of one embodiment of the presently disclosed method of controlling a guard tour of a thermal camera (600). The method comprises the steps of: obtaining a guard tour comprising a plurality of views of an area or facility and a sequence of movements and view times of the thermal camera for traversing the plurality of views (610); controlling the thermal camera to traverse the plurality of views according to the sequence of movements and view times of the guard tour (620); for each view: computing or extracting a temperature profile based on thermal images from the thermal camera (630); based on the temperature profile, estimating whether an increased risk of overheating or overcooling exists for the view (640); and if an increased risk of overheating or overcooling exists, adjusting the sequence of movements and/or view times of the thermal camera to show the view having an increased risk of overheating or overcooling more frequently (650).

A 'guard tour' within the context of the present disclosure may be defined as a sequence of movements of a camera. More specifically, a thermal pan-tilt camera or a pan-tilt-zoom camera, such as a fixed thermal pan-tilt camera or a pan-tilt-zoom camera, may be used. Typically, the thermal PTZ camera will be configured to cover a first sub-view of the area or facility for a first period of time. When the first period of time has lapsed, the thermal PTZ camera is reconfigured to cover a second sub-view of the area or facility for a second period of time. When the second period of time has lapsed, the thermal PTZ camera is reconfigured to cover a third sub-view of the area or facility for a thirds period of time, and so forth. When all selected sub-views have been traversed, the thermal PTZ camera will normally re-start from the first sub-view again.

As would be understood by a person skilled in the art, the use of a thermal PTZ camera does not exclude having additional thermal PTZ cameras. For example, a first thermal PTZ camera could cover a number of views related to a first part of an area or facility, whereas a second thermal PTZ camera could cover a number of views related to a second part of an area or facility.

As stated, there are several ways of implementing the step of adjusting the sequence of movements and/or view times of the thermal camera to show the view having an increased risk of overheating or overcooling more frequently. In one embodiment, the step of adjusting the sequence of movements and/or view times of the thermal camera to show the view more frequently comprises reducing the view time for at least one of the other views. In practice this means that the time between observations of the view for which an increased risk of overheating or overcooling exists is reduced. In this scenario, the guard tour will get back to the view having an increased risk of overheating or overcooling sooner compared to the original or the previous configuration of the guard tour. The view time for one or more of the other views may thereby by reduced at least 2 seconds, or at least 5 seconds.

In a further embodiment, the step of adjusting the sequence of movements and/or view times of the thermal camera to show the view more frequently comprises reducing the view time for all of the other views, or reducing the view time for all of the other views for which an indicated risk of overheating or overcooling has not been estimated to exist. This may be seen as more aggressive reduction since it will cut view times on all views that do not comprise an immediate risk of overheating or overcooling. The view time for the views for which an indicated risk of overheating or overcooling has not been estimated to exist may thereby be reduced at least 2 seconds, or at least 5 seconds.

Figure 2:
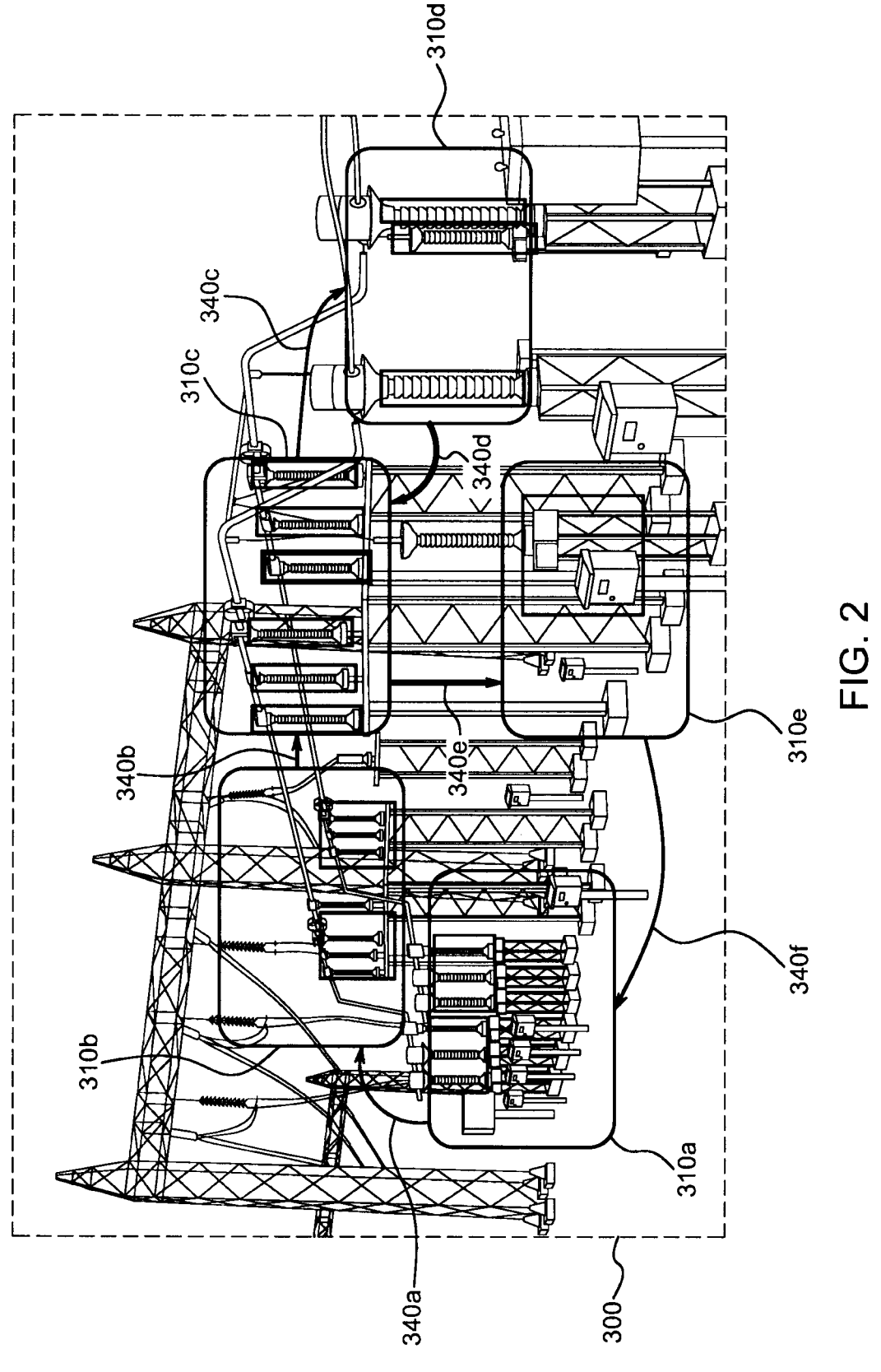
FIG. 2 shows an example of a guard tour performed by the presently disclosed method of controlling a guard tour of a thermal camera.

In a further embodiment, the step of adjusting the sequence of movements and/or view times of the thermal camera to show the view more frequently comprises adding at least one further instance of the view having an increased risk of overheating or overcooling in the sequence of movements and/or view times of the camera for traversing the plurality of views. In practice this means that the guard may come back to the view having an increased risk of overheating or overcooling more than once for each round of the guard tour. FIGS. 1-2 can be used to illustrate the concept. In FIG. 1 the guard tour comprises the sequence of transitions 340*a*, 340*b*, 340*c*, 340*d*, 340*e* for traversing the views 310*a*, 310*b*, 310*c*, 310*d*, 310*e*. In FIG. 1 one of the sub-views (330) of the view 310*c* is identified as a sub-view having an increased risk of overheating. For this reason, view 310*c* is categorized as a view in which there is an increased risk of overheating or overcooling. In FIG. 2 the guard tour has been adjusted to include a further instance view 310*c*, which is the view having an increased risk of overheating or overcooling. The sequence of transitions 340*a*, 340*b*, 340*c*, 340*d*, 340*e* now traverses the views in the following order: 310*a*, 310*b*, 310*c*, 310*d*, 310*c*, 310*e*. In one embodiment the view having an increased risk of overheating or overcooling is visited at least two times during one guard tour. The view having an increased risk of overheating or overcooling may also be visited at least three times, at least four times or any suitable number of timer per guard tour. In one embodiment, the view having an increased risk of overheating or overcooling is visited after every other view.

A 'temperature profile' may be a plain extraction of a temperature based on thermal images in a view. A color in a thermal image can typically be directly translated to a temperature. The temperature can be a temperature at a specific spot, or, for example, an average in the view or in a sub-view, such as a transformer in an electrical substation, a part of a machine or an item at a waste management area or facility. The sub-view may cover a specific at risk of overheating or overcooling. A 'temperature' may thus be a temperature in a spot at a certain time, an average in the spot for a part or the whole view time, an average temperature for a part or the whole view for the whole or a part of the view time.

A 'temperature profile' may comprise a temperature gradient, which may be a temperature gradient for the whole view time for the view or for a part of the view time. The purpose of such a temperature gradient is normally to provide a measure of change of temperature. A quick temperature increase may typically be an indication of risk of fire. The temperature gradient may also be a more long-term gradient, wherein a temperature in the current view and temperatures from one or more previous stops of the thermal PTZ camera in the same view are used in an extraction or calculation of the temperature gradient.

Accordingly, in one embodiment of the presently disclosed method of controlling a guard tour of a thermal camera, the temperature profile for each view comprises a current temperature for the view and/or a current temperature gradient for the view time or a part of the view, wherein it is estimated that an increased risk of overheating or overcooling exists if the current temperature exceeds a predefined temperature limit and/or if the current temperature gradient exceeds a predefined temperature gradient limit.

Figure 3A:
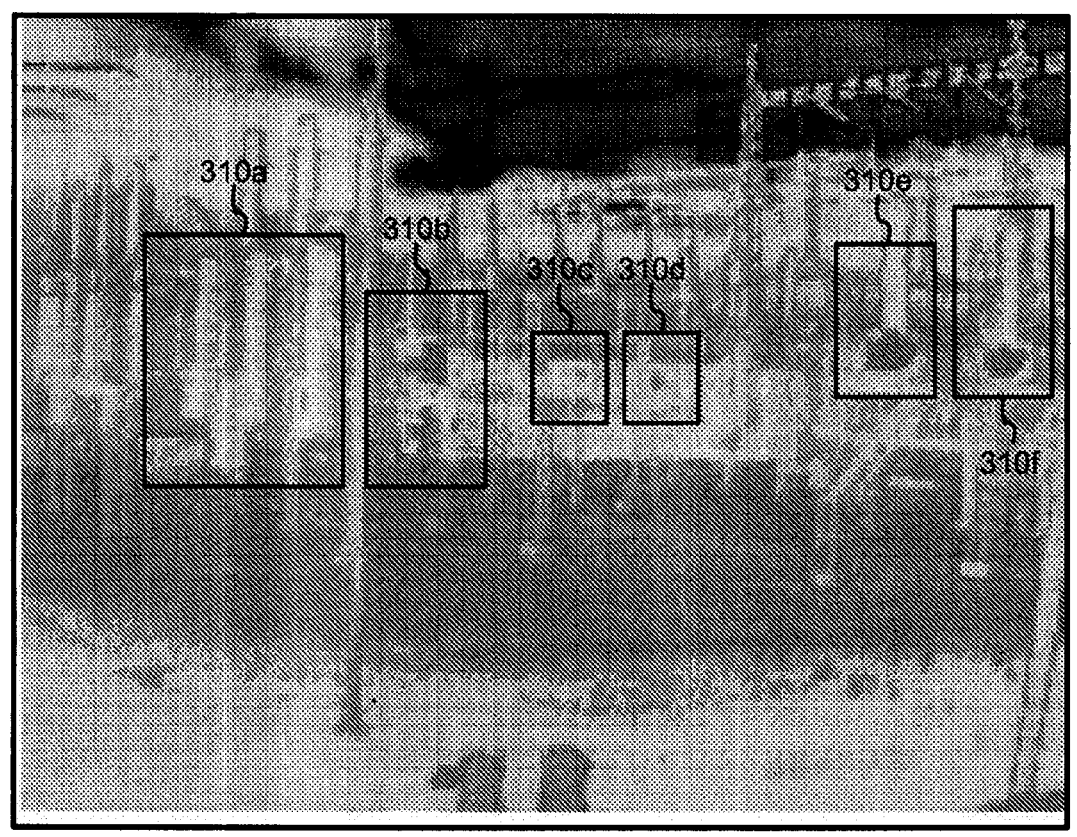
FIGS. 3A-B show examples of thermal images of a plurality of views of an electrical substation.
Figure 3B:
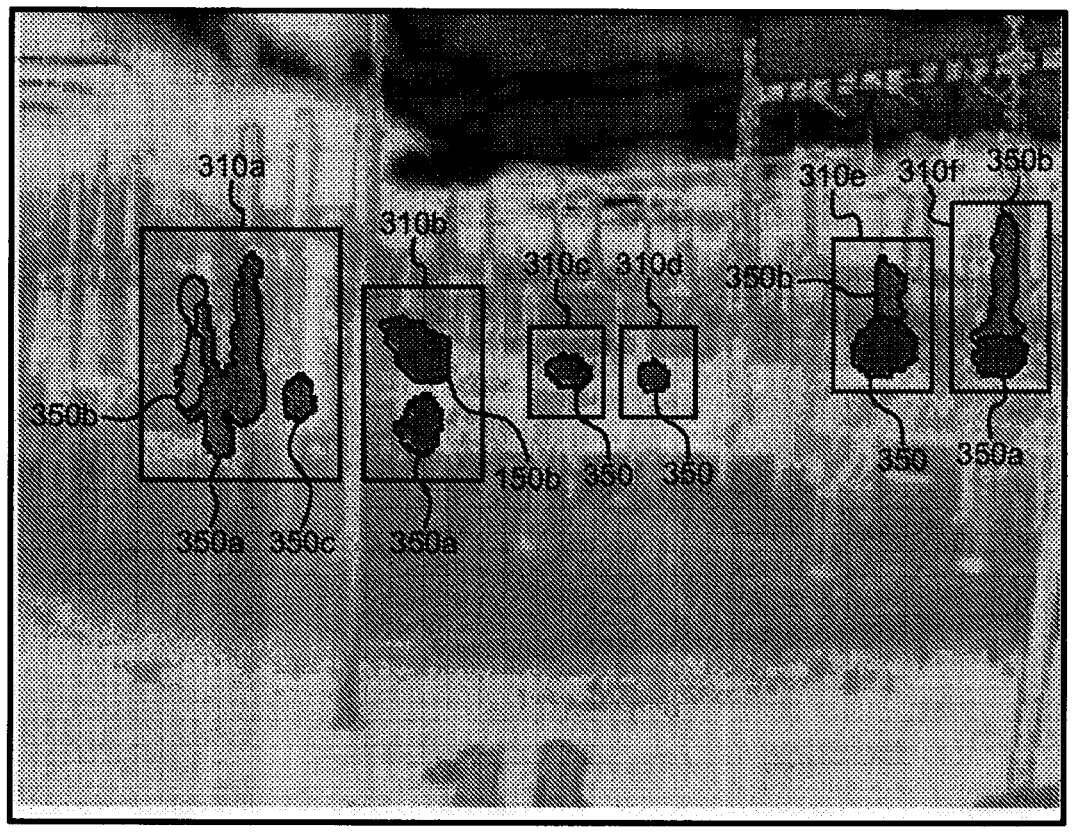

FIGS. 3A-B show examples of thermal images of a plurality of views of an electrical substation. FIG. 3A represents a situation in which thermal images have been captured during a first guard tour. FIG. 3B represents a situation, in which thermal images have been captured during a second guard tour. In FIG. 3A there are no major signs of high or low temperatures or quick changes in temperature. In FIG. 3B, compared to FIG. 3A, certain areas (350, 350*a*, 350*b*, 350*c*) within the views (310*a*, 310*b*, 310*c*, 310*d*, 310*e*, 310*f*) show signs of higher temperatures. Based on the temperature profiles, it can now be estimated whether an increased risk of overheating exists. This can be done, for example, by checking if the current temperature exceeds a predefined temperature limit and/or if the current temperature gradient exceeds a predefined temperature gradient limit. In case it is estimated that a risk of overheating exists, the sequence of movements and/or view times of the thermal camera can be adjusted accordingly, for example, as shown in FIG. 2B. In FIG. 3B it can be noted that for some views, for example view 310*a*, areas (350*a*, 350*b*, 350*c*) with different temperature increases have been identified. This can be used, for example, in a process of determining a spatial distribution of the temperature in a view.

In a further embodiment, the temperature profile for each view comprises a spatial temperature distribution, wherein it is estimated that an increased risk of overheating or over-cooling exists if the spatial temperature distribution exceeds a predefined temperature distribution limit. A 'spatial temperature distribution' may be seen as an expansion of a temperature increase or decrease in an area. If, for example, a short circuit occurs in a certain component or cable, it may be observed as an increase in temperature that spreads to areas directly in contact with the component or cable, or located nearby. In the perspective of a thermal camera this may be seen as a 'spatial temperature distribution', typically by observing the expansion of colored areas representing higher temperatures. The same phenomenon may occur in other type of areas, such as, waste management sites and garbage dumps. If a temperature increases at a specific point in, for example, a garbage dump, a manufacturing area or process industry premises, the increase may spread to areas located. There are accordingly, several ways of observing or extracting a spatial temperature distribution. As a non-limiting example, it is possible to observe (a) temperature(s) at one or more predefined distances of a first spot at several points in time. If a comparison against a predefined temperature provides that the temperature exceeds the pre-defined temperature in the first spot and then at a first distance, it may be useful to state that the spatial temperature distribution exceeds a predefined temperature distribution limit. The concept of spatial temperature distribution applies to both increasing temperatures (related to overheating) and decreasing temperatures (overcooling).

The temperature profile for each view may comprise a spatial and temporal temperature distribution. This may be seen as a spatial temperature distribution over time i.e., a certain minimum temperature (or maximum temperature in the case of overcooling) spreads to a larger area over time. Based on the spatial and temporal temperature distribution, it may be estimated that an increased risk of overheating or overcooling exists if the spatial and temporal temperature distribution exceeds a predefined spatial and temporal temperature distribution limit.

Figure 4:
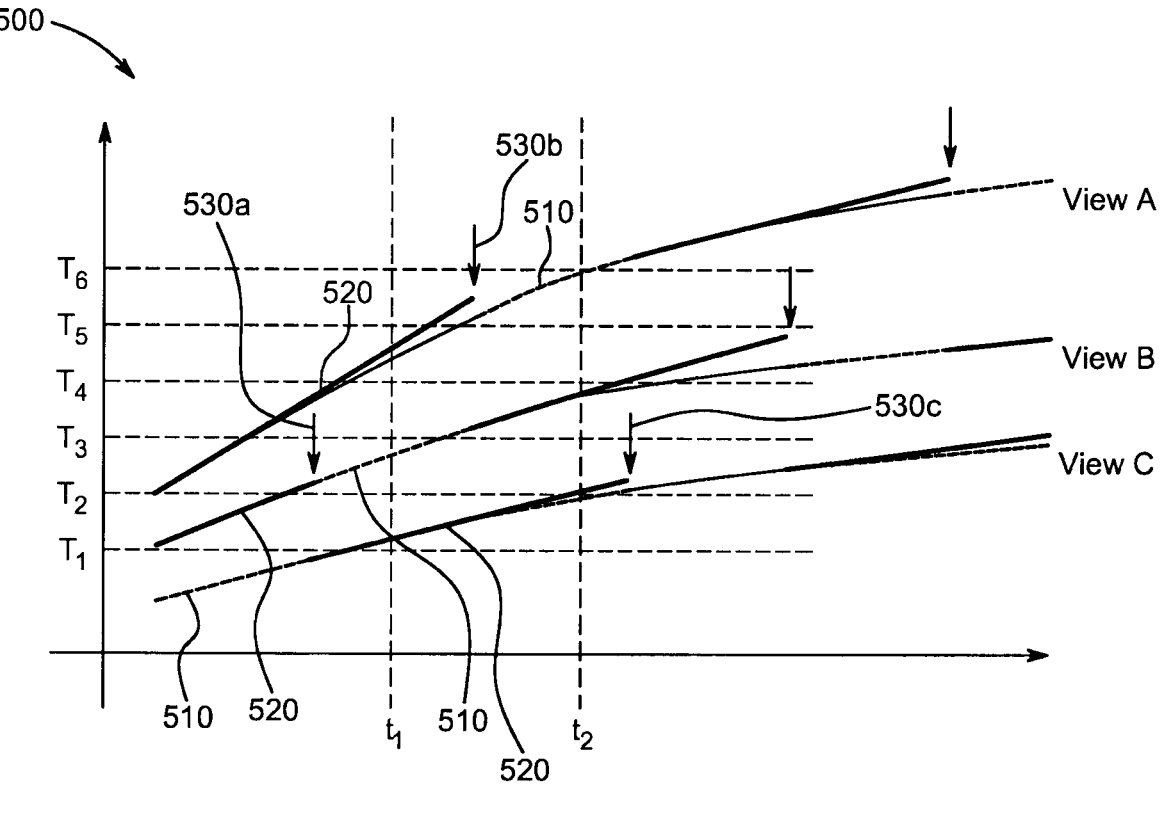
FIG. 4 shows an example of how temperatures are measured and extrapolated in different views.

In one embodiment of the presently disclosed method of controlling a guard tour of a thermal camera, the temperature profile for each view comprises temperature data from corresponding views from at least one previous traverse of the plurality of views, wherein the step of estimating whether an increased risk of overheating or overcooling exists for the view is based on a temperate gradient between different traverses. The concept of a 'guard tour' of a thermal PTZ camera normally implies that the thermal PTZ camera cannot monitor and analyse the whole area at the same time, and therefore needs to divide its time between the plurality of views. This has the consequence that while the present system and method estimates whether an increased risk of overheating or overcooling exists for one view, changes may occur in other views that are not covered by the thermal PTZ camera at the time. It is possible, within the concept of the presently disclosed method and system for controlling a guard tour of a thermal camera, to process views that are not currently covered by the thermal PTZ camera. In one embodiment, the temperature profile for at least one view is an extrapolation of the temperature profile from a previous traverse of the plurality of views. FIG. 4 shows an example of temperature monitoring based on thermal images in three views: View A, View B and View C. The thermal PTZ camera in the example of FIG. 4 can only cover one of the areas of Views A, B and C at a time. During a first period of time the thermal PTZ camera captures thermal images of View C (510). During this period Views A and B are extrapolations of previous measurements. At 530*a*, the thermal PTC camera moves to View B and the temperature of View B is adjusted to a temperature from real thermal images, whereas the temperatures of Views A and C are extrapolations. At 530*b*, the thermal PTC camera moves to View A and the temperature of View A is adjusted to a temperature from real thermal images, whereas the temperatures of Views B and C are extrapolations. It is possible to process a view that is currently not covered by the thermal PTZ camera. In that case an extrapolated temperature profile may be used for estimating whether an increased risk of overheating or overcooling exists for the view rather than the actual temperature profile.

The disclosure further relates to a surveillance system comprising:

a thermal pan-tilt camera or a pan-tilt-zoom camera configurable to capture thermal images of an area or facility;

a processing unit configured to:

obtain a guard tour comprising a plurality of views of the area or facility and a sequence of movements and view times of the thermal camera for traversing the plurality of views;

controlling, or providing controlling data to an operator or control unit to control the thermal camera to traverse the plurality of views according to the sequence of movements and view times of the guard tour;

for each view:

computing or extracting a temperature profile based on thermal images from the thermal camera;

based on the temperature profile, estimating whether an increased risk of overheating or overcooling exists for the view; and if an increased risk of overheating or overcooling exists, adjusting the sequence of movements and/or view times of the thermal camera to show the view having an increased risk of overheating or overcooling more frequently.

As would be understood by a person skilled in the art, the presently disclosed method of controlling a guard tour of a thermal camera, may be performed using any embodiment of the presently disclosed surveillance system, and vice versa.

The invention claimed is:

1. A method of controlling a guard tour of a thermal camera, wherein the thermal camera is a pan-tilt camera or a pan-tilt-zoom camera, the method comprising the steps of:

a) obtaining a guard tour, wherein the guard tour comprises:

a plurality of views, of an area or facility, for a thermal camera to traverse in a pre-defined sequence of movements, and pre-defined view times that the thermal camera is to remain at each of the plurality of views before moving to the next view in the pre-defined sequence;

b) performing a first cycle of the guard tour by controlling the thermal camera to traverse the plurality of views according to the pre-defined sequence of movements, wherein the thermal camera stays for the pre-defined view time in each of the plurality of views during the first cycle;

for each view during the first cycle of the guard tour:

c) computing or extracting a temperature profile based on thermal images from the thermal camera, d) based on the temperature profile, estimating whether an increased risk of overheating or overcooling exists for the view, and e) if an increased risk of overheating or overcooling exists, adjusting the guard tour by: adding an additional instance, to the pre-defined sequence, of the view having the increased risk of overheating or overcooling and reducing the view time for at least one of the other views; and performing a second cycle of the guard tour by iteratively repeating steps b) to e) during the existence of the increased risk of overheating or overcooling, wherein, during the second cycle, the guard tour is executed with either the added instance of the view or the reduced view time for the at least one of the other views.

2. The method of controlling a guard tour according to claim 1, wherein the thermal camera is part of surveillance.

3. The method of controlling a guard tour according to claim 1, wherein the guard tour obtained in step a) has the same view time for all of the plurality of views.

4. The method of controlling a guard tour according to claim 1, wherein the step of adjusting the guard tour comprises reducing the view time for all of the other views, or reducing the view time for all of the other views for which an indicated risk of overheating or overcooling has not been estimated to exist.

5. The method of controlling a guard tour according to claim 1, wherein the view having an increased risk of overheating or overcooling is visited at least two times during one cycle of the guard tour.

6. The method of controlling a guard tour according to claim 1, wherein the temperature profile for each view comprises a current temperature for the view and/or a current temperature gradient for the view time or a part of the view, wherein it is estimated that an increased risk of overheating exists if the current temperature exceeds a predefined temperature limit and/or if the current temperature gradient exceeds a predefined temperature gradient limit, or wherein it is estimated that an increased risk of overcooling exists if the current temperature is lower than a predefined temperature limit and/or if the current temperature gradient is lower than a predefined temperature gradient limit.

7. The method of controlling a guard tour according to claim 1, wherein the temperature profile for each view comprises a spatial temperature distribution, wherein it is estimated that an increased risk of overheating or overcooling exists if the spatial temperature distribution exceeds a predefined temperature distribution limit.

8. The method of controlling a guard tour according to claim 1, wherein the temperature profile for each view comprises a spatial and temporal temperature distribution, wherein it is estimated that an increased risk of overheating or overcooling exists if the spatial and temporal temperature distribution exceeds a predefined spatial and temporal temperature distribution limit.

9. The method of controlling a guard tour according to claim 1, wherein the temperature profile for each view comprises temperature data from corresponding views from at least one previous traverse of the plurality of views, wherein the step of estimating whether an increased risk of overheating or overcooling exists for the view is based on a temperate gradient between different traverses.

10. The method of controlling a guard tour according to claim 1, wherein the temperature profile for at least one view is an extrapolation of the temperature profile from a previous cycle of the guard tour.

11. The method of controlling a guard tour according to claim 1, wherein the area or facility is an electrical substation, a manufacturing area, process industry premises or a waste management area or facility.

12. A non-transitory computer readable storage medium storing a computer program having instructions which, when executed by a computing device or computing system, cause the computing device or computing system to carry out a method for controlling a guard tour of a thermal camera, wherein the thermal camera is a pan-tilt camera or a pan-tilt-zoom camera, the method comprising the steps of:

a) obtaining a guard tour, wherein the guard tour comprises:

a plurality of views, of an area or facility, for a thermal camera to traverse in a pre-defined sequence of movements, and pre-defined view times that the thermal camera is to remain at each of the plurality of views before moving to the next view in the pre-defined sequence;

b) performing a first cycle of the guard tour by controlling the thermal camera to traverse the plurality of views according to the pre-defined sequence of movements, wherein the thermal camera stays for the pre-defined view time in each of the plurality of views during the first cycle;

for each view during the first cycle of the guard tour:

c) computing or extracting a temperature profile based on thermal images from the thermal camera, d) based on the temperature profile, estimating whether an increased risk of overheating or overcooling exists for the view, and e) if an increased risk of overheating or overcooling exists, adjusting the guard tour by: adding an additional instance, to the pre-defined sequence, of the view having the increased risk of overheating or overcooling and reducing the view time for at least one of the other views; and performing a second cycle of the guard tour by iteratively repeating steps b) to e) during the existence of the increased risk of overheating or overcooling, wherein, during the second cycle, the guard tour is executed with either the added instance of the view or the reduced view time for the at least one of the other views.

13. A surveillance system comprising:

a thermal pan-tilt camera or a pan-tilt-zoom camera configurable to capture thermal images of an area or facility;

a processing unit configured to:

a) obtain a guard tour, wherein the guard tour comprises:

a plurality of views, of an area or facility, for a thermal camera to traverse in a pre-defined sequence of movements, and pre-defined view times that the thermal camera is to remain at each of the plurality of views before moving to the next view in the pre-defined sequence;

b) control, or provide controlling data to an operator or control unit to control the thermal camera to perform a first cycle of the guard tour by traversing the plurality of views according to the pre-defined sequence of movements, wherein the thermal camera stays for the pre-defined view time in each of the plurality of views during the first cycle;

for each view during the first cycle of the guard tour:

c) compute or extract a temperature profile based on thermal images from the thermal camera, d) based on the temperature profile, estimate whether an increased risk of overheating or overcooling exists for the view, and e) if an increased risk of overheating or overcooling exists, adjusting the guard tour by: adding an additional instance, to the pre-defined sequence, of the view having the increased risk of overheating or overcooling and reducing the view time for at least one of the other views; and e)

performing a second cycle of the guard tour by iteratively repeating steps b) to e) during the existence of the increased risk of overheating or overcooling, wherein, during the second cycle, the guard tour is executed with either the added instance of the view or the reduced view time for the at least one of the other views.

* * * * *